No. 696,269. Patented Mar. 25, 1902.
A. REINLE.
SHOW CASE.
(Application filed Nov. 26, 1901.)
(No Model.)
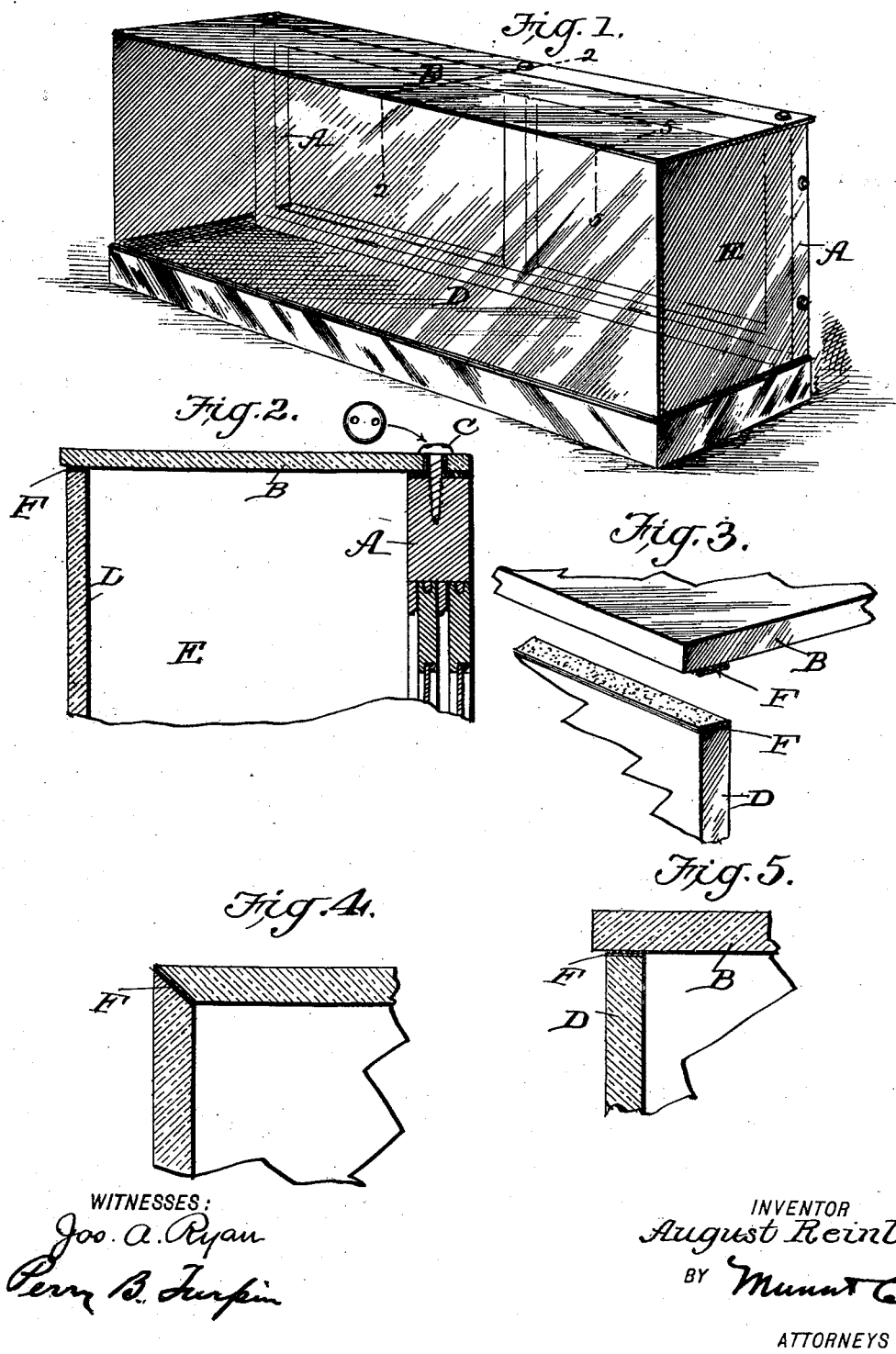
WITNESSES:
Jos. A. Ryan
Perry B. Turpin
INVENTOR
August Reinle
BY Munn&Co.
ATTORNEYS
THE NORRIS PETERS CO., PHOTO-LITHO., WASHINGTON, D. C.

UNITED STATES PATENT OFFICE.

AUGUST REINLE, OF BALTIMORE, MARYLAND.

SHOW-CASE.

SPECIFICATION forming part of Letters Patent No. 696,269, dated March 25, 1902.

Application filed November 26, 1901. Serial No. 83,751. (No model.)

*To all whom it may concern:*

Be it known that I, AUGUST REINLE, a citizen of the United States, and a resident of Baltimore, in the State of Maryland, have made certain new and useful Improvements in Show-Cases, of which the following is a specification.

My invention is an improvement in show-cases, in which may also be included show-windows; and the invention consists in the construction of the case, as will be hereinafter more fully described and claimed.

In the drawings, Figure 1 is a perspective view of a case embodying my invention. Fig. 2 is a detail section on about line 2 2 of Fig. 1. Fig. 3 is a detail perspective view showing the top and front plates detached. Fig. 4 is a section showing a different form of joint. Fig. 5 is an enlarged section on about line 5 5 of Fig. 1.

In the construction of all-glass show-cases—that is to say, show-cases in which the plates are united without any molding or frame—it becomes desirable to connect the glass in such way as to avoid any interference with the neat appearance of the case, and in carrying out my invention I prefer to unite by cementing the abutting plates together. I also employ a metallic layer overlying the uniting cement and adhering to the inner surface of the glass, so the case will present the appearance of having a metallic layer, which may be silver or gilt, as desired, at the point of contact of the adjoining glass plates. It may be necessary to only provide this layer of metal on one side of the cement, as on the upper side in cases where the lower side of the cement would not be in sight, as in a low case where the under side of the cement could only be seen by stooping down below normal position. In forming this case by cementing the plates together I prefer to employ a back frame A, of wood, and secure the top plate B to the back frame by means of screws C, the front plate D being cemented to the side plates E and such plates D and E being cemented to the top plate B to unite the plates B, D, and E to form the complete case. Manifestly the cement would show through the glass plates and would present an appearance which would be detrimental in an ornamental case. For this reason I prefer to employ the metallic layer deposited upon the glass at the point of proposed contact or union and to cement the adjoining plates together with the metallic layer overlying the cement, so the cement will not be exposed to view through the glass.

It will be understood that the invention will be found useful where the edge of one plate is cemented to or against the face of an adjoining plate and also where the edges of two plates, which may be beveled, as shown in Fig. 4, are cemented together.

In carrying out my invention I first deposit a metallic layer F on the glass at the point of proposed contact. This may preferably be effected by employing a liquid containing the metal in suspension, so the metal will be precipitated or deposited upon and adhere to the glass, forming a deposited metallic strip or layer upon the glass at the point of proposed contact. As before suggested, this metallic layer may be formed on both plates designed to be united, or it may be on only one of the plates, where the other side of the cement would not be in sight. Cement will then be applied to one or both of the plates and the same pressed together to effect the cemented union with the metallic layer or strip overlying the cement. The metallic layer projecting beyond the contacting portions of the adjoining glasses may then be removed by means of a sharp chisel or other suitable tool, and the cement when set will retain the plates and at the same time will be covered by the metallic layer, which will improve the appearance of the case and give the same a fine finish, as desired.

It will be understood that appearance is of great importance in show-cases and that means which contribute to improve the appearance of a case constitute important improvements in the class of inventions in question.

The case when completed will include the adjoining plates of glass united by cement with a deposited metallic strip or layer between the cement and the surface of the glass.

Having thus described my invention, what I claim as new, and desire to secure by Letters Patent, is—

1. A show-case comprising plates of glass adjoining each other, a deposited metallic layer on one of the plates at the point of union, and cement between said plates and underlying the metallic layer substantially as set forth.

2. A show-case comprising the adjoining glass plates, the deposited metallic layer on the surfaces of both said plates at the point of union, and cement between the glass plates and between the metallic layers thereof, whereby the plates will be united and the cement will be hidden from view by the metallic layers substantially as set forth.

3. In a show-case the combination of the adjoining glass plates, cement for uniting the plates together, and a deposited metallic layer on the inner surface of one of the plates and overlying the uniting cement substantially as set forth.

AUGUST REINLE.

Witnesses:
SOLON C. KEMON,
PERRY B. TURPIN.